United States Patent Office 3,538,108
Patented Nov. 3, 1970

3,538,108
WATER - SOLUBLE 2 - SUBSTITUTED BENZ-IMIDAZOLE METHANESULFONIC ACID SALTS
Seemon H. Pines, Murray Hill, N.J., assignor to Merck & Co., Inc., Rahway, N.J., a corporation of New Jersey
No Drawing. Filed Aug. 17, 1967, Ser. No. 661,223
Int. Cl. C07d 91/32
U.S. Cl. 260—302                              3 Claims

ABSTRACT OF THE DISCLOSURE

Water-soluble, non-toxic methanesulfonic acid salts of 2-substituted benzimidazoles are prepared by reacting approximately equimolar amounts of the benzimidazole and methane sulfonic acid. It is contemplated that dosage units containing these benzimidazole methanesulfonate as the essential active ingredients will be administered in the treatment and control of helminthiasis.

BACKGROUND OF THE INVENTION

Field of the invention

The invention relates to water-soluble salts of certain 2-substituted benzimidazoles and to a method for their preparation. The compounds are benzimidazole methanesulfonic acid salts and are useful as anthelmintics.

Description of the prior art

Certain 2-aryl and 2-heteroaryl benzimidazoles are known in the art, and are known to possess significant anthelmintic activity. The compounds as a class are generally highly insoluble in water, thus limiting the mode of administration to an infected host to specific types of carriers or water suspensions of the benzimidazoles. The purpose of the present invention is to provide a simple and economical means of preparing water-soluble substituted benzimidazoles. The mineral acid salts of the 2-substituted benzimidazoles which have heretofore been prepared, such as the hydrochlorides or phosphates, generally have only limited solubility in water. By the present invention stable, non-toxic, highly water-soluble salts of certain 2-aryl and 2-heteroaryl benzimidazoles are provided which retain the anthelmintic efficacy of the free bases.

SUMMARY OF THE INVENTION

Novel 2-aryl and 2-heteroaryl benzimidazole salts of methanesulfonic acid, a method of preparing them and compositions containing a novel 2-substituted benzimidazole methanesulfonic acid addition salt as the active ingredient are provided. The novel 2-substituted benzimidazole salts are highly water soluble and retain the anthelmintic potency of the free base.

DESCRIPTION OF THE PREFERRED EMBODIMENTS

The infection known as helminthiasis involves infestation of the body of warm-blooded animals and particularly the gastrointentinal tract of man and domestic animals such as sheep, cattle, goats, swine, dogs, and poultry with certain species of parasitic worms known generally as helminths. Helminthiasis is a disease of major concern when viewed from the aspect of public health and from the aspect of the economic loss resulting from helminthic infestation of domesticated animals. Thus, the provision of improved compositions and methods for the treatment and elimination of helminthiasis, and the parasitic worms responsible for this disease, is most desirable.

Certain 2-substituted benzimidazoles which are known in the art are highly effective anthelmintic agents. The free bases, however, are virtually insoluble in water and, unless utilized in the form of certain of their acid-addition salts, must be used in suspension. Acid-addition salts such as the hydrohalides have been found to give a degree of water-solubility to substituted benzimidazoles, but such solubility is generally in the order of about 1% to a maximum of about 2% by weight of the benzimidazole present. This degree of water solubility is inadequate where, for example, the anthelmintic benzimidazole is to be employed in solution for domestic animals in uniform concentrations suitable for easy ingestion. For practical reasons, solutions used for this purpose generally contain at least one gram of free base per fluid ounce, a concentration of said base in water in excess of 3%. Such solutions of acid-addition salts are not practicable for packaging or transportation, while dissolution of these salts in aqueous medium immediately prior to use is often inconvenient and uniformly slow.

By the present invention, novel compounds are provided which are effective in the treatment, prevention and control of helminthiasis which are non-toxic and which are easily and conveniently administered in uniform concentrations. The compounds are effective in preventing the development of infective eggs and/or larvae of worms, thereby minimizing the possibility of contamination and subsequent re-infestation.

The novel water-soluble benzimidazoles which are the subject of this invention may be depicted as follows:

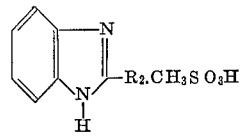

where $R_2$ is a 5-membered heterocyclic radical selected from the group consisting of furyl, pyrryl, thienyl, thiazolyl, isothiazolyl, and thiadiazolyl, or a 6-membered aromatic ring selected from the group consisting of phenyl, halophenyl, and pyridyl.

The novel methanesulfonic acid addition salts can be prepared from 2-substituted benzimidazoles which may be substituted on the 6-membered aromatic ring and the N-1 nitrogen of the benzimidazole nucleus.

The 6-membered aromatic ring of the benzimidazole may, if desired, be substituted at a carbon atom with, for example, a loweralkyl radical such as methyl, ethyl, propyl and butyl, a loweralkoxy radical such as methoxy, ethoxy, and propoxy, phenyl, halophenyl, phenoxy, halogen and trifluoroalkyl, such as trifluoromethyl.

The N-1 position of the benzimidazole ring may, if desired, be substituted with, for example, a loweralkyl radical, a loweralkoxy radical or a loweralkenyl radical such as allyl and methallyl.

Illustrative of the substituted benzimidazole compounds from which the methanesulfonic acid salts can be prepared are:

2-(4'-thiazolyl)-benzimidazole,
2-(3'-thienyl)-benzimidazole,
2-(2'-furyl)-benzimidazole,
2-(2'-pyrryl)-benzimidazole,
1-ethyl-2-(2'-pyrryl)-benzimidazole,
1-allyl-2-(3'-thienyl)-benzimidazole,
2-(2'-thiazolyl)-benzimidazole,
2-(4'-[1',3',4'-thiadiazolyl])-benzimidazole,
5-trifluoro-methyl-2-(3'-thienyl)-benzimidazole,
5-phenyl-2-(4'-thiazolyl)-benzimidazole,
1-methyl-2-(2'-furyl)-benzimidazole,
5-chloro-1-methyl-2-(3'-thienyl)-benzimidazole,
1-ethyl-2-(2'-thiazolyl)-benzimidazole,
5-ethoxy-2-(3'-thienyl)-benzimidazole, 2-phenylbenzimidazole,
2-p-fluorophenyl-benzimidazole,
2-(2'-pyridyl)-benzimidazole,
5-phenyl-2-(4'-isothiazolyl)-benzimidazole,
5-methyl-2-(2'-thiazolyl)-benzimidazole, and
5-chloro-2-(2'-furyl)-benzimidazole.

The novel salts can be prepared by reacting approximately equimolar amounts of the benzimidazole and methanesulfonic acid. The benzimidazole is generally dissolved or suspended in an appropriate solvent such as water, alcohol, dimethylformamide, or dimethylsulfoxide. The methanesulfonic acid is generally added in portions over a period of 15–30 minutes with stirring. The solid is generally dissolved after addition of the acid is complete and the solution is stirred an additional 10–20 minutes to ensure complete reaction. Although it is preferred to use equimolar amounts of the reactants, a slight excess of the acid can be employed where the final product is to be isolated and purified. Upon standing, the salt generally settles out of solution. The solid is filtered off and washed with an appropriate solvent such as cold ethanol or acetone or some other solvent in which the salt is insoluble. Where the salt does not settle out of solution, the solvent is partially removed in vacuo and the concentrated solution is cooled to about 10° C. The product generally settles out of solution and is collected by filtration or other techniques known in the art.

Because of the increased solubility of the product salt in solvents such as water or ethanol, better yields are obtained when the solvent is essentially completely removed before the salt is collected. The product is generally crystalline and is essentially pure, requiring little or no further purification. However, the salt can be recrystallized by dissolving it in a small volume of a warm solvent such as ethyl alcohol and chilling the solution before filtration. The yield of methanesulfonate obtained by this procedure is generally good, yields as high as 85% have been obtained. Where a quantitative yield is desired, one can re-use the mother liquor as the solvent for a subsequent preparation in order to obtain maximum recovery, or one can concentrate the filtrate to increase the over-all yield. In addition to elemental analysis, the purity of the solid is generally determined by ultraviolet spectra in water.

The novel methanesulfonates are unexpectedly highly water soluble, e.g., the solubility of the methane-sulfonic acid addition salt of 2-(4'-thiazolyl)-benzimidazole is calculated at about 25% by weight. The content of the benzimidazole in the latter compound is about 16% by weight. This high degree of solubility is unexpected in view of the fact that the known salts of these benzimidazoles, such as the hydrochlorides and phosphates, have only limited solubility in water, generally of the order of about 1–3% by weight of the benzimidazole present.

While preferably used in aqueous solutions, the salts of the invention may be employed in solvents such as propylene glycol, dimethyl sulfoxide, and dimethylformamide, or they may be employed therapeutically in the form of a capsule, tablet, or bolus.

The salts can also be prepared as dry powders which can be stored and transported as such, and which can be conveniently dissolved in solution when desired.

Because of the high solubility in water, the substituted benzimidazole salts can be administered orally, but parenteral, intramuscular, and subcutaneous administration are also contemplated.

Where oral administration is employed, the salt can be added to the drinking water just before use, or a drench formulation can be prepared in advance which may be diluted up to the desired concentration at the time of use. Where practicable, the salt need not be isolated from the original reaction solvent before use. A sufficient amount of the solvent may be added to bring the salt entirely into solution and the appropriate concentration can then be administered to the infected host. In such cases, equimolar amounts of the benzimidazole and methanesulfonic acid are employed to avoid any excess of unreacted starting material. Generally, a dosage rate of about 30–50 mg. of benzimidazole per kilogram of animal body weight is employed. In the drench preparations, concentrations of about 10%–40% wt./vol. may be employed. The exact percentage used will depend upon the dosage level required and the limitation imposed on the volume to be administered.

The following results with sheep were obtained using 2-(4'-thiazolyl)-benzimidazole methanesulfonate in the form of a drenching solution. The extent of infection was compared at necropsy with infested controls. The drenching solution was administered orally as a 20% aqueous solution. The animals treated were infected with Ostertagia, T. axei, T. colubriformis, Haemonchus, Oesophagostomum, Chabertia, and Nematodirus. The various groups were treated at dose rates equivalent to 28, 42, and 56 mg. of the free base:

WORM EGG COUNTS

|  | Dose rate, mg./kg. | Pre-treatment | Post treatment |
| --- | --- | --- | --- |
| Control | | 1,600 | 4,600 |
| 2-(4'-thiazolyl)-benzimidazole methanesulfonate | 28 | 1,500 | 0 |
| Do | 42 | 1,700 | 0 |
| Do | 56 | 1,900 | 0 |

When administered in powdered form, the benzimidazole methanesulfonate salt may be dispersed in or admixed with standard elements of animal sustenance, such as feed, or other orally ingestible carriers, such as distillers' dried grains, corn meal, alfalfa, ground oyster shells, molasses solubles, corn cob meal, and the like. This method is usually employed when it is desired to administer the compounds either as therapeutic or prophylactic agents over an extended period.

When the salt is employed in the form of a capsule, tablet, or bolus, the compounds can be administered orally in a unit dosage form wherein the compounds may be blended with one or more innocuous orally ingestible excipients including diluents, fillers, binders, lubricants, disintegrating agents, and similar standard formulations. Enteric vehicles and compositions particularly useful for the treatment of animals suffering from severe helminthic infection of the intestinal tract can also be employed.

The proportion of active ingredients in the above media of administration may vary widely depending upon the desired dosage sought to be administered to the infected host. Thus, tablets, boluses and the like, whether enteric in nature or not, can incorporate, for example, from about 5% to about 70% of the anthelmintic agent measured on the basis of the weight of the benzimidazole component of the salt.

Such procedures as outlined above involve the possibility of irregular concentrations of the anthelmintic agent as well as other difficulties and disadvantages which are readily avoided by use of these compounds in the preferred form of their aqueous solutions.

The following examples are given for the purpose of illustration and not by way of limitation:

EXAMPLE 1

2-(4'-thiazolyl)-benzimidazole methanesulfonate 300 gm. (1.49 mole) of 2-(4'-thiazolyl)-benzimidazole are placed in 500 ml. of water and to this mixture is added dropwise 149.7 gm. (1.56 mole) of methanesulfonic acid over a 15-minute period. The dark solution is treated with 20 grams of Darco, heated briefly on a steam bath and is filtered while hot. The filtrate is concentrated in vacuo to a thick slurry. The slurry is cooled to 40° C., filtered and the solid is washed with ethanol and dried in vacuo. The mother liquors are concentrated to a small volume and the resulting slurry is heated and diluted with ethanol. The mixture is cooled to room temperature and filtered. The solid is washed with ethanol and dried in vacuo. The two fractions are combined to yield 375.4 gm. (85%) of 2-(4'-thiazolyl)-benzimidazole methanesulfonate. The product analyzes for $C_{11}H_{11}N_3O_3S_2$

EXAMPLE 2

2-(3'-thienyl)-benzimidazole methanesulfonate 29.6 gm. (0.1 mole) of 2-(3'-thienyl)-benzimidazole are added to 50 ml. of water and to this mixture is added dropwise 9.6 gm. (0.11 mole) of methansulfonic acid with stirring over a 15-minute period. The mixture is stirred an additional 15 minutes after the addition of the methanesulfonic acid is complete. The dark solution is treated with 2 gm. of Darco, heated 5–10 minutes on a steam bath, and filtered while hot. The filtrate is concentrated in vacuo to a thick slurry. The mixture is cooled and the solid is filtered off and washed with ethanol. After the salt is dried in vacuo essentially pure 2-(3'-thienyl)-benzimidazole methanesulfonate is obtained.

When in the above procedure 2-(2'-pyrryl)-benzimidazole, 2-(2'-thiazolyl)-benzimidazole, and 2-(2'-furyl)-benzimidazole are employed in place of 2-(2'-thienyl)-benzimidazole, there are obtained 2-(2'-pyrryl)-benzimidazole methanesulfonate, 2-(2'-thiazolyl)-benzimidazole methanesulfonate, and 2-(2'-furyl)-benzimidazole methanesulfonate, respectively.

EXAMPLE 3

5-methyl-2-(2'-thiazolyl)-benzimidazole methanesulfonate 31.1 gm. (0.1 mole) of 5-methyl-2-(2'-thiazolyl)-benzimidazole are added to 50 ml. of water and to this mixture is added dropwise 9.6 gm. (0.11 mole) of methanesulfonic acid with stirring over a 15-minute period. After the addition of the methanesulfonic acid is complete, the mixture is stirred an additional 15 minutes. The dark solution is treated with 3 gm. of Darco, heated 5–10 minutes on a steam bath, and filtered while hot. The filtrate is concentrated in vacuo to a thick slurry. The salt is filtered off, washed well with ethanol, and, after drying in vacuo, essentially pure 5-methyl-2-(2'-thiazolyl)-benzimidazole methanesulfonate is obtained.

When in the above procedure 1-ethyl-2-(2'-pyrryl)-benzimidazole, 1-allyl-2-(3'-thienyl)-benzimidazole, 5-phenyl-2-(4'-thiazolyl)-benzimidazole, and 5-ethoxy-2-(3'-thienyl)-benzimidazole are employed in place of 5-methyl-2-(2'-thiazolyl)-benzimidazole, there are obtained 1-allyl-2-(2'-pyrryl)-benzimidazole methanesulfonate, 1-allyl-2-(3'-thienyl)-benzimidazole methanesulfonate, 5-phenyl-2-(4'-thiazolyl)-benzimidazole methanesulfonate, and 5-ethoxy-2-(3'-thienyl)-benzimidazole methanesulfonate, respectively.

It should be understood that although this invention has been described with reference to particular embodiments thereof, changes and modifications may be made which are within its intended scope.

What is claimed is:

1. A 2-substituted benzimidazole methanesulfonic acid addition salt wherein the substituent at the 2-position is a radical selected from the class consisting of furyl, pyrryl, thienyl, thiazolyl, isothiazolyl, thiadiazolyl, phenyl, halophenyl and pyridyl radicals.

2. The compound of claim 1 wherein the substitutent at the 2-position is a radical selected from the group consisting of thiazolyl, isothiazolyl, and thiadiazolyl.

3. The compound of claim 1 wherein the substituent at the 2-position is 4'-thiazolyl.

References Cited

UNITED STATES PATENTS 3,017,415   1/1962   Sarett et al. _____ 260—302

OTHER REFERENCES

Protiva et al.: Chem. Abstracts, vol. 52, pp. 4666–7 (1958).

ALEX MAZEL, Primary Examiner

R. J. GALLAGHER, Assistant Examiner

U.S. Cl. X.R.

260—294.8; 424—263, 270